May 8, 1945. A. D. GARRISON 2,375,641
TREATMENT OF CLAYS
Filed Feb. 13, 1943
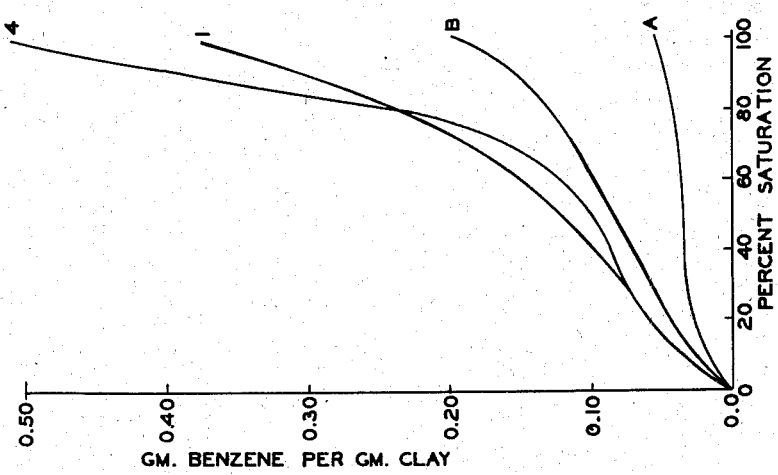
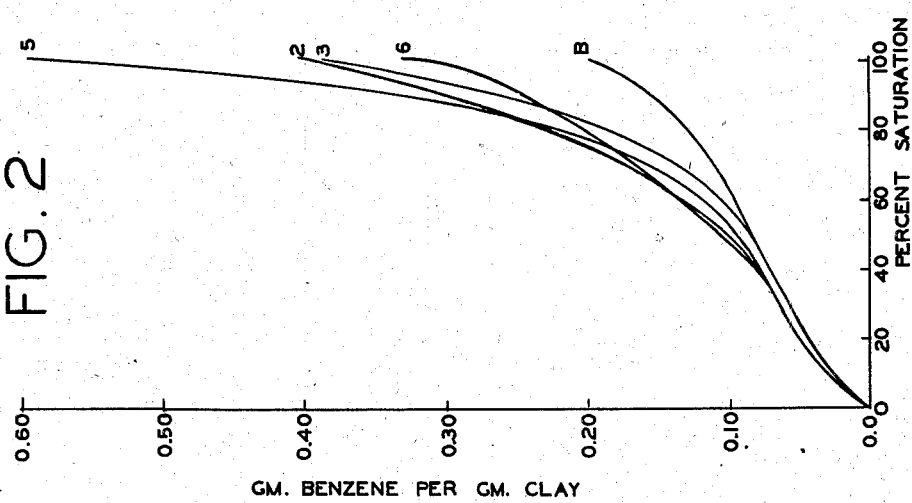
ALLEN D. GARRISON
INVENTOR
BY
His Attorneys Patented May 8, 1945

2,375,641

UNITED STATES PATENT OFFICE 2,375,641

TREATMENT OF CLAYS

Allen D. Garrison, Houston, Tex., assignor to Texaco Development Corporation, New York, N. Y., a corporation of Delaware Application February 13, 1943, Serial No. 475,784

11 Claims. (Cl. 252—300)

This invention relates to the improvement of clays. More specifically, it relates to improvements in the processes of treating natural clays whereby the adsorptive capacity of the clay is substantially increased and whereby the efficiency of the clay for various uses is materially improved. Among such uses are the decolorization of liquids such as vegetable, animal and mineral oils, and the catalytic promotion of various reactions. Clays prepared in accordance with the invention are particularly useful in cases where the efficiency of the action of a clay is directly or indirectly related to the adsorptive capacity and wherein the value of the clay may be improved by an increase in its adsorptive capacity. Although increased adsorptive capacity of the clay is the primary object and accomplishment of the invention, there are other advantages to be derived, such as: improved speed of clay treating, reduction of total equipment required for a given clay capacity, and improved physical hardness which renders the clay more suitable for fluid type catalytic processes, or for contact or percolation type of bleaching.

Clays found in some selected localities are naturally endowed with relatively high surface area and with an open or spongy texture which permits ready access of materials in solution or in the gaseous state. Such natural adsorptive capacity seems to have been the result of a certain specialized history of the clay in nature, whereby its chemical nature, its high surface area, and its open texture were all fortuitously adjusted Other clays, more abundant in distribution, do not have the adsorptive capacity already well developed. Apparently their natural history lacks some procedures which would render their chemical nature, their surface area, or their texture suitable for efficient adsorption.

Clays are fundamentally alumino-silicates containing different amounts of other materials. Their compositions are usually expressed in terms of the percentage of each metallic element expressed in the form of its oxide. Thus the composition of a sample of a Texas sub-bentonite was found to be as follows:

| | Per cent |
|---|---|
| $SiO_2$ | 57.66 |
| $Al_2O_3$ | 19.59 |
| $Fe_2O_3$ | 4.92 |
| $CaO$ | 4.05 |
| $MgO$ | 3.32 |
| $H_2O$ | 9.54 |
| $Na_2O$ | Small |
| $K_2O$ | Small |

The above analysis was conducted on the dry sample which had lost 8.18 per cent water at 105° C. It is recognized that the metals do not exist in the clay as mixed oxides. The above clay was characteristic of many clays which may be converted into adsorptive clays in that an analysis by the X-ray method revealed that its structure was that of montmorillonite and therefore it is an example of a class of clays that are termed clays of the montmorillonite type. In this structure, the silicon and aluminum atoms lie in planes bound together by oxygen links. The other metals such as Fe, Ca, Mg, may be either chance metallic substitutes for the aluminum or silicon in the regular atomic arrangement of the crystal sheets, or they may be simply adsorbed and partly exchangeable or replaceable ions loosely attached at the surfaces or edges of the crystal sheets. The metals contained in clays, other than silicon and aluminum, are regarded as exchangeable bases, although in certain cases these metals at least partly are tightly bound in the clay structure and form a nonexchangeable portion. By acid treatment these bases together with some aluminum may be removed at least partly from the clay, the clay thereby being converted into an acid clay and usually of increased $SiO_2$ content.

While the above description discloses an example of what is connoted by the term "clay," it also explains the impossibility of defining the term in exact chemical compositions and the impossibility of expressing the effect of processes which are designed to improve the clay in terms of chemical composition or in terms of changes in chemical composition. The adsorptive capacity of the clay is dependent on its ability to bind certain materials to its surface. It is clear that the surface composition is important, and that one clay may have a better surface than another because of its composition.

But at least three other properties of the clay are vital to its value. The first is the extent of the area, which must be relatively high in order that much material may be attached to it in the adsorbing process, and, second, its texture must be open enough to permit the materials being adsorbed from the liquid or gaseous state to pass through the aggregates of minute crystals to the surface, and, third, the hardness of the clay granules or aggregates must be sufficient to withstand the attrition involved in its normal use. We have determined that certain clays may have the desirable surface quality as well as the desirable surface area, but possess a texture so compact, with openings leading into the structure so small, that adsorption is retarded. The material which is to be adsorbed possesses molecules either too large to enter such a structure at all, or large enough to obstruct the rapid diffusion of the material into the surface area.

Furthermore, in the use of a clay as a catalyst or as a catalytic carrier, it is sometimes found that the products of the reaction accumulate in the pores of the solid clay granules. For continued use, the clay must be repeatedly cleaned and regenerated. Although the surface of the clay may have the required quality, and although the area may be exceptionally well developed, it is possible that the pores leading to this area may be so small that they are easily obstructed. Thus, the active catalytic life would be low and the speed of cleaning and regeneration retarded.

In describing the improvements, it is desirable to present the results of controlled adsorption measurements in order that the improvements may be properly evaluated without reference to too limited conditions of use, and without reference to any range of fixed compositions as expressed by chemical analysis.

Such controlled adsorption measurements may be advantageously presented in the form of an adsorption isotherm. An adsorption isotherm is a graphical representation of the amount of a material adsorbed at constant temperature as a function of the pressure of the vapor (or the concentration of a solution) of the material being adsorbed. It is now customary to use some vapor for this measurement wherein the dimensions of the molecules are known, so that it is possible to estimate, from the adsorption isotherm, both the area of the surface of the adsorbing material and the distribution and sizes of the pores. There are various mathematical formulae available for such an estimation. One which is rather recent and general in its application is described by Brunauer, Emmett and Teller in the Journal of the American Chemical Society, volume 60, page 309, 1938; and by Brunauer, Deming, Deming and Teller in the Journal of the American Chemical Society, volume 62, page 1723, 1940. This method was used in my work to make quantitative estimates of the increases in area and porosity derived from my processes. Another method of quantitative evaluation of the porosity of an adsorbing material is the older and well-known equation of Thomson, Philosophical Magazine (London) volume 42, (4) page 448, 1871, which expresses the amount of vapor adsorbed in the larger capillaries of a porous solid in terms of the sizes of the pores.

Without quantitative calculations, and without reference to whether the improvement is primarily due to increasing the area or due to increasing the porosity (size and number of the pores) of the clay, it is evident from an inspection of the amount of material adsorbed under specified conditions that the processes disclosed herein materially increase the adsorbing capacity of the clay. Adsorption isotherms using benzene vapor at various pressures and at 26.2° C. are therefore presented in the drawing for purposes of disclosing the improvements which result from my process as compared with those usually attained by methods which have heretofore been used to increase the capacity of the clay.

In application Serial No. 418,030 of Allen D. Garrison and K. C. ten Brink, filed November 6, 1941, processes of treating clays are described. One process disclosed in that application comprises dispersing and hydrating a clay, adding an inorganic gel to the dispersed and hydrated clay, and drying the mixture. This results in a clay in which the extended area characteristic of the dispersed and hydrated clay is retained in the dried material, which therefore has improved adsorptive capacity.

In accordance with the present invention I have discovered that clays, particularly clays of the montmorillonite type, of improved adsorptive capacity can be prepared by a process comprising first preparing a mixture of the clay in finely-divided and dispersible form with an alkaline dispersing agent and preferably a hydrated inorganic gel, and then extruding the mixture under a high fluid friction such that accelerated hydration and dispersion of the clay take place. While in the hydrated and dispersed state, replaceable metals, particularly alkali metals, are then completely removed from the clay. To accomplish this and also to improve further the adsorptive characteristics, the clay-gel mixture is acid-treated.

The manner in which this acid treatment is preferably conducted constitutes one of the features of my invention. I apply a strong mineral acid such as strong hydrochloric or sulfuric acid to the extruded clay and permit some preliminary reaction to take place. I prefer to use in this step sulfuric acid in concentrations ranging from about 45 to 98 per cent. The acid is then diluted by the addition of water, and the usual acid-boiling procedure conducted. The application of the strong mineral acid to the dispersed, hydrated and extruded clay causes an important improvement in its character. The open clay structure is hardened. Granules are produced which resist attrition to colloidal dimensions, but retaining the open and spongy texture which characterize a good adsorptive clay. The acid treating and subsequent washing are facilitated. The clay slurry does not become thick and viscous during acid treating; thus the volume of the treating vessels may be reduced. The same character persists during washing; consequently settling is rapid and complete after each wash.

Thus, it will be seen that the process of the present invention is a substantial improvement over the process of application Serial No. 418,030 in at least two respects: first, the hydration of the clay and the separation of the primary crystals is greatly accelerated by fluid friction in the presence of a dispersing agent which provides the clay with exchangeable alkali ions, and also preferably in the presence of an inorganic gel which acts to augment the fluid friction; secondly, a larger amount of clay may be processed in equipment of a given size since dilute clay slurries are avoided.

When a clay is in the dispersed and hydrated state, the available area of the clay is extended over the available area of the original clay. A clay in which the exchangeable ions are entirely $Li^+$ and $Na^+$, with some $K^+$ is usually easily dispersible in water alone. But this condition is rather rare in nature, since $H^+$, $Ca^{++}$, and $Mg^{++}$ ions are widely available in the earth's crust and are strongly adsorbed to clay surfaces. A clay which is difficult to disperse in $H_2O$ alone because of its prior history may be dispersed by grinding the clay and mixing the finely-divided product with an alkaline aqueous solution. In the dispersed and hydrated condition the clay has an extended area apparently due to the fact that the super-imposed crystal sheets of alumino-silicate have become separated by the adsorption of alkali ions and water so that the primary crystals are freed and spaced. However, upon washing the clay dispersion free of alkalis and drying, the extended structure collapses and the available area returns substantially to what it was before the treatment. Apparently, it is not feasible by this treatment alone to accomplish any substantial permanent improvement in the adsorptive characteristics of the clay.

The present invention is based upon the discovery that a clay of desirable area and porosity can be obtained by a procedure in which prolonged prior dispersion and hydration is not necessary. Apparently, the dispersible clay in the presence of the water of the hydrated inorganic gel is so affected by the pressure and friction of the extrusion that dispersion and at least partial hydration of the clay take place very quickly. Thus, the area of the clay is extended and in this condition the clay is intimately mixed or combined with the inorganic gel. As a result the inorganic gel remains between the clay crystals and the extended area of the clay is retained after drying, and the porosity of the clay is improved.

In speaking of a dispersible clay, a clay is meant which when saturated with alkali metal ions can be dispersed in water to form a colloidal solution; i. e., a solution containing particles at least one dimension of which is of the order of $10^{-4}$ to $10^{-5}$ cm. or less. Many of the montmorillonite clays or bentonites occur in nature in a dispersible form and such clays may be extruded with a gel which does not contain an alkaline dispersing agent. However, as a general rule, dispersible bentonitic clays are relatively rare and it is generally preferred to employ a clay of the type described as a sub-bentonite. An analysis of a clay of this class was given previously. Such clays are generally distinguished from the more dispersible types in that they contain less alkali metal. When using a clay which is not naturally dispersible, a dispersing agent should be included in the mixture of clay and inorganic gel and this constitutes one of the novel features of my invention. Alkali metal hydroxides and alkaline salts of alkali metals may be used as dispersing agents, sodium hydroxide and sodium carbonate being especially preferred. Accordingly, a clay is said to be dispersible when the clay is dispersible under the conditions existing at the time of extrusion.

Various kinds of inorganic gels can be used in the process. In this connection it is pointed out that the term inorganic gel is used in its broad sense to include highly dispersed gelatinous precipitates whether or not such precipitates are perfect examples of gels. The difference between a highly dispersed gelatinous precipitate and a perfect gel is based merely upon the proportion retained of the liquid in which the compound was dissolved. Therefore, there is no clear line of demarcation between the gelatinous precipitates and the true gels and it is customary to refer to them generically as inorganic gels and this practice will be followed here. Especially important examples of such gels are silica gel and highly dispersed or colloidal metallic oxides, particularly alumina gel and chromia gel.

The present process may be carried out by separately preparing the hydrated inorganic gel and then adding the alkaline dispersing agent and finally the clay in dry, finely-divided form such that it is composed of particles which will pass a 100 mesh screen. I have discovered that a particularly valuable method consists of adding carbon dioxide gas to a commercial sodium silicate solution in water until a silica gel is formed containing sodium carbonate dissolved in the gel water. This gel may be used immediately without washing since the sodium carbonate is an excellent clay-dispersing agent. The hydrated inorganic gel contains the water of gel formation and the amount of water should be such that the resulting mixture is of extrudable consistency. I have found that the extrusion is best when conducted at sufficient pressure to develop intense fluid friction. For example, when extruding through a $\frac{3}{32}$ inch die, the pressure is preferably at least 100 pounds per square inch and may be as high as 1200 to 3000 pounds per square inch. Accordingly, the water content of the mixture should be such as to require a pressure of the above order. It will be understood that where other orifices are used, the conditions of extrusion should correspond to those described above, in order that suitable fluid friction and turbulence may promote the separation of the sheets of clay.

The amount of gel required to accomplish the purposes of the invention is small in relation to the amount of clay treated, and may be varied depending on the particular clay and the effect desired. It has been found as a general rule that the use of an amount of hydrated gel in which the non-aqueous component is equal to about 7 to 10 per cent by weight of the clay is satisfactory, and it is considered that the use of amounts corresponding to from about 5 to 12 per cent should produce the results desired in most cases. The water content of the gel may also vary depending upon the amount of gel used and the particular clay treated. In general, if the weight of water present in the mixture is the same order of magnitude as the combined weight of the gel and the clay, the mixture will have the proper consistency. This desirable consistency is usually attained when the density of the mixture of clay, gel, water, and dispersing agent falls within the range 1.25 to 1.55 grams per cubic centimeter.

The clays which can be prepared by the present process may be employed in various decolorizing and catalytic processes. When they are to be used as catalysts for particular reactions, it is preferred to incorporate in them catalytic materials which are active in the reaction in question. In many cases, the inorganic gel employed may also have catalytic properties either alone or in cooperation with the clay and in these cases no additional materials need be added. Where it is not desirable to use a sufficient amount of the catalytic material to accomplish the spacing of the clay or the material does not form an inorganic gel of the desired characteristics, the material or materials may be added to the product at any convenient point in the process. It has been found that metal oxides which have catalytic properties can be added to the clay efficiently by introducing them into the mixture of clay and gel just prior to extrusion or they may be added later to the extruded clay structure.

The following examples of the operation of my invention are given by way of illustration. In order to provide a basis for comparison, two samples of the clay used in all of the examples, a Texas sub-bentonite, were taken and treated in the following manner. The first sample, referred to as Sample A, was dispersed in water and was found to have a natural pH of approximately 5.6, indicating that the clay was already partly converted into an acid clay in nature. This sample was washed and dried and the adsorption isotherm for benzene at 26.2° C. was determined. This appears in Figure I of the drawings as Curve A.

Since this clay is one which is commonly used for decolorizing petroleum oils after it has been subjected to a treatment which consists of dispersion in water, screening and treatment with sulfuric acid of 8 per cent concentration at the boiling temperature for six hours, the second sample, referred to as Example B, was treated in this way and was then washed and dried. The benzene vapor adsorption isotherm was then determined and appears in Figures 1 and 2 of the drawings as Curve B.

Where parts are mentioned in the following examples they are by weight. Where a sodium silicate solution is mentioned, a commercial grade of sodium silicate dissolved in water having the following composition is indicated: $SiO_2$ 28.7%, $Na_2O$ 8.85%, $H_2O$ 62.2%.

Example 1

70 parts of sodium silicate solution, 10 parts of sugar and 337 parts of water were stirred rapidly while carbon dioxide gas was passed into the mixture. The entire mass set into a gel at about pH 10. This gel was broken up and mixed with 180 parts of clay which was air dried and ground to pass a 100 mesh screen. This mixture was extruded once at less than 100 pounds per square inch (#) through a $\frac{3}{32}$ inch orifice. A little water was evaporated and it was extruded a second time at 500#. It was again dried partly and extruded twice at 1500#. This clay-gel mixture had a density of 1.5 grams per cubic centimeter. 100 parts of 98% sulfuric acid was then used to completely wet the extruded clay mass. The acid was permitted to react with the clay at room temperature for about twelve hours. Water was then added to make the acid strength 10%, and the acid-clay slurry boiled for a period of 6 hours. The clay was then thoroughly washed with distilled water, dried and heated to 900° F. for 6 hours. The benzene adsorption isotherm appears in Figure 1 of the drawings as Curve No. 1. The sugar which was incorporated in the gel in this example is not essential to the process. The use of sugar or other similar material, however, has the advantage of increasing the viscosity and pressure of extrusion above that which would be derived from the water solution alone.

Example 2

139 parts of sodium silicate solution was diluted with 673 parts of water, and while stirring rapidly, carbon dioxide gas was introduced until the entire mixture gelled at about pH 9.3. The gel was immediately mixed with 360 parts of air-dried 100 mesh clay, and was extruded twice at a pressure slightly below 100# through a $\frac{3}{32}$ inch orifice. This extruded and dispersed clay mixture was wet with a mixture of 217 parts of sulfuric acid (98%) and 20 parts of water. The mixture was kept at normal air temperature for about twelve hours, water was added to reduce the acid strength to 10%, and the clay slurry boiled for 6 hours. The clay was then washed thoroughly with distilled water, dried and heated to 900° F. for 6 hours. The benzene adsorption isotherm for this clay appears in Figure 2 of the drawings as Curve No. 2.

Example 3

A preparation of silica gel was made by mixing 210 parts of sodium silicate solution with 933 parts of water, and while stirring very rapidly, adding 50% hydrochloric acid solution. The gel set up completely by the time a pH of 8 was attained. This gel was broken up and washed free of chloride ions. Water was then slowly evaporated from the gel until its silica content was 10%, water 90%. This gel was mixed with 100 mesh clay in such proportion that 90 parts of clay was associated with 10 parts of $SiO_2$. Sodium carbonate was added in the ratio 4 parts to 100 parts of silica and clay. This mixture of silica gel, sodium carbonate and clay was extruded through a $\frac{3}{32}$ inch orifice at 1000#. It was then slightly dried and again extruded at 1300#. Approximately 50% of the clay weight of concentrated sulfuric acid was mixed with enough water to constitute a 46% solution. This 46% solution of acid was mixed with the extruded clay and the reaction conducted at about 80° C. for a short time (30 to 50 min.) Enough water was then added to reduce the acid strength to 10%, and the slurry boiled for 6 hours. The clay was then washed, dried and heated to 900° F. for 6 hours. The benzene adsorption isotherm for this clay appears in Figure 2 of the drawings as Curve No. 3.

Example 4

70 parts of sodium silicate solution were mixed with 222 parts of water and carbon dioxide passed in during rapid stirring until the entire solution set into a gel. This occurred at about 10.1 pH. The gel was immediately mixed with 180 parts of 100 mesh clay and the mixture extruded twice at approximately 100#. 153 parts of 98% sulfuric acid was then mixed with the extruded clay and the acid-wet mixture kept at room temperature for about twelve hours. Water was then added until the acid strength was reduced to 15% and the slurry boiled for 6 hours. The clay was then washed, dried and heated for 6 hours at 900° F. The benzene adsorption isotherm for this clay sample appears in Figure 1 of the drawings as Curve No. 4.

Example 5

210 parts of sodium silicate solution, 30 parts of sugar and 1010 parts of water were mixed rapidly and carbon dioxide introduced slowly while the solution was rapidly stirred. The entire mixture set into a gel at about 9.45 pH. This gel was immediately mixed with 540 parts of dried clay passing a 100-mesh screen. The mixture was extruded through a $\frac{3}{32}$ inch orifice at approximately 100# pressure. The density of this mixture was about 1.27 grams per cubic centimeter. 510 parts of 98% sulfuric and 280 parts of water were mixed and added to the extruded clay. The acid which contacted the clay was about 63% sulfuric acid. This mixture was allowed to react at room temperature for about twelve hours, water was then added to reduce the strength of the acid to 10%, and the slurry was boiled for a period of 6 hours. The clay was then washed thoroughly, dried, and heated to 900° F. for 6 hours. The benzene adsorption isotherm for this clay appears in Figure 2 of the drawings as Curve No. 5.

Example 6

The procedure described in the case of Example 5 was duplicated in every respect except that, during the extrusion steps, the clay was dried slightly and again extruded at 1700#. The clay had a density of 1.51 grams per cubic centimeter after extrusion. The acid reaction was conducted as in the case of Example 5. The benzene adsorption isotherm for this example appears in Figure 2 of the drawings as Curve No. 6. It is noteworthy that the total pore volume of this example as indicated by its adsorption of saturated benzene vapor, while materially higher than the pore volume Sample B, was reduced well below that of the Example 5 by the reduction of the water content at the time of the reaction of the extruded clay with the strong acid. Thus by the proper adustment of the water content at the time the strong acid reacts with the extruded clay, it is possible to regulate the total pore volume of the clay to any desired value, within wide limits.

It is possible to attain some of the advantages of my invention without the addition of the inorganic gel to the clay at the time of the extrusion, provided that other conditions of the preparation are carefully controlled. The resulting clay lacks some of the ease of handling which is attained when the gel is incorpororated, and the degree to which the porosity of the clay may be extended is somewhat limited. The following example illustrates such a preparation.

*Example 7*

50 parts of air-dried 100 mesh clay were mixed with 2 parts of sodium carbonate as dispersing agent and 35 parts of water. A viscous paste resulted. This was kept at room temperature for twelve hours, and was then extruded through a $\frac{1}{32}$ inch orifice at a pressure below 100#. After carefully controlled drying, the mixture was again extruded twice at 1500#. 27.5 parts of 98% sulfuric acid were mixed with enough water to form approximately a 65 to 70% solution, and this solution of strong mineral acid was poured over the extruded clay mixture. The reaction between the strong mineral acid and the clay was conducted for about thirty to forty minutes at 80° C. Sufficient water was then added to yield a 10% solution of acid, and the slurry boiled for 6 hours. The clay was then washed thoroughly with distilled water, dried at 120° C., again washed to complete the removal of basic sulfates, and finally dried and heated to 900° F. for 6 hours. The benzene adsorption isotherm for this sample was almost identical with that for Example 3 above, differing only in having slightly less adsorption below 60 per cent saturation, and very slightly more adsorption above 60 per cent saturation. For practical comparisons, isotherm 3 in the drawing represents the adsorptive capacity of this clay.

From the Example 7, it is shown that the action of the fluid friction and the dispersing agent is fairly effective in dispersing the clay, and it is shown that the reaction with strong mineral acid while the clay is in the dispersed and hydrated state is capable of retaining a substantial part of the porosity which is thus developed, but by comparison with the results of the other examples in which the extrusion takes place in the presence of a hydrous inorganic gel, it may be seen that the extrusion with gel not only enlarges the possible improvements, but simplifies other processing problems.

The use of carbon dioxide for the treatment of an alkaline silicate solution to produce both a silica gel and an alkaline dispersing agent has been disclosed in the examples. It will be understood that somewhat similar results may be obtained with other weak acids, such as lower aliphatic acids, especially acetic acid. However, carbon dioxide is preferred both for the reason it is convenient to use from a procedural standpoint and for the reason it forms insoluble salts with calcium and other metals that may be present in the clays.

From the foregoing it will be seen that I have provided novel processes of treating clays wherein a mass of a clay and water and comprising an alkaline dispersing agent and preferably also comprising a hydrated inorganic gel is extruded under a high fluid friction such that accelerated hydration and dispersion of the clay take place. Although the alkaline dispersing agent is usually added to the clay, in cases where the clay is naturally highly dispersible because of a high content of an alkaline substance functioning as a dispersing agent, this agent need not be added as it is a component of the clay as obtained in nature. By acid treating the extruded clays, products are obtained in excellent condition for use as adsorptive materials and as catalysts.

Obviously many modifications and variations of the invention as hereinbefore set forth may be made without departing from the spirit and scope thereof, and therefore only such limitations should be imposed as are indicated in the appended claims.

I claim:

1. The process of treating a natural clay to improve the surface characteristics thereof which comprises preparing a mass of the clay and water and comprising an alkaline dispersing agent, extruding the mass under a high fluid friction, and then removing replaceable metals from the extruded product.

2. The process of treating a natural clay to improve the surface characteristics thereof which comprises preparing a mass of the clay and water and comprising an added alkaline dispersing agent, extruding the mass under a high fluid friction to accomplish dispersion and hydration of the clay, removing replaceable metals from the extruded product by treating the product while in the dispersed and hydrated state with a mineral acid, and drying the resulting acid-treated material.

3. The process of treating a natural clay to improve the surface characteristics thereof which comprises preparing a mass of the clay and water and comprising an added alkaline dispersing agent, extruding the mass under a high fluid friction corresponding to a pressure of about 100 pounds per square inch and above through a $\frac{1}{32}$ inch orifice to accomplish dispersion and hydration of the clay, removing replaceable metals from the extruded product by treating the product while in the dispersed and hydrated state with a mineral acid and drying the resulting acid-treated material.

4. The process of treating a natural clay to improve the surface characteristics thereof which comprises preparing a mass of the clay and water and comprising an added alkaline dispersing agent, extruding the mass under a high fluid friction corresponding to a pressure of about 100 pounds per square inch and above through a $\frac{1}{32}$ inch orifice to accomplish dispersion and hydration of the clay, removing replaceable metals from the extruded product by treating the product while in the dispersed and hydrated state with sulfuric acid, washing the product free of acid, and drying the resulting acid-treated material.

5. The process of treating a natural clay to improve the surface characteristics thereof which comprises preparing a mass of the clay and a hydrated inorganic gel and comprising an alkaline dispersing agent, extruding the mass under a high fluid friction to accomplish dispersion and hydration of the clay, removing replaceable metals from the extruded product by treating the product while in the dispersed and hydrated state with a mineral acid, and drying the resulting acid-treated material.

6. The process of treating a natural clay to improve the surface characteristics thereof which comprises preparing a mass of the clay and a hydrated inorganic gel and comprising an added alkaline dispersing agent, extruding the mass under a high fluid friction corresponding to a pressure of about 100 pounds per square inch and above through a $\frac{1}{32}$ inch orifice to accomplish dispersion and hydration of the clay, removing replaceable metals from the extruded product by treating the product while in the dispersed and hydrated state with sulfuric acid, washing the product free of acid, and drying the resulting acid-treated material.

7. The process of treating a natural clay of the montmorillonite type to improve the surface characteristics thereof which comprises preparing a mass of the clay and a hydrated inorganic gel and comprising an added alkaline dispersing agent, extruding the mass under a high fluid friction to accomplish dispersion and hydration of the clay, treating the extruded product while in the dispersed and hydrated state with a strong mineral acid, diluting the acid by addition of water, heating the resulting mixture to complete reaction between the acid and replaceable metals in the extruded product, washing the product free of acid, and drying the resulting acid-treated material.

8. The process of treating a natural clay of the montmorillonite type to improve the surface characteristics thereof which comprises preparing a mass of the clay and hydrated silica gel and comprising an added alkaline sodium compound, extruding the mass under a high fluid friction to accomplish dispersion and hydration of the clay, treating the extruded product while in the dispersed and hydrated state with strong sulfuric acid, diluting the acid by addition of water, heating the resulting mixture to complete reaction between the acid and replaceable metals in the extruded product, washing the product free of acid, and drying the resulting acid-treated material.

9. The process of treating a natural clay of the montmorillonite type to improve the surface characteristics thereof which comprises combining the clay with a mixture of hydrated silica gel and an alkaline alkali metal compound prepared by reacting a solution of an alkali metal silicate with a weak acid until the silica gel forms but the mixture remains alkaline, extruding the resulting mass under a high fluid friction to accomplish dispersion and hydration of the clay, removing replaceable metals from the extruded product by treating the product while in the dispersed and hydrated state with a mineral acid, washing the product free of acid, and drying the resulting acid-treated material.

10. The process of treating a natural clay of the montmorillonite type to improve the surface characteristics thereof which comprises combining the clay with a mixture of hydrated silica gel and sodium carbonate prepared by passing carbon dioxide into a solution of sodium silicate until the silica gel forms but the mixture remains alkaline, extruding the resulting mass under a high fluid friction corresponding to a pressure of about 100 pounds per square inch and above through a $\frac{1}{32}$ inch orifice to accomplish dispersion and hydration of the clay, removing replaceable metals from the extruded product by treating the product while in the dispersed and hydrated state with sulfuric acid, washing the product free of acid, and drying the resulting acid-treated material.

11. The process of treating a natural clay of the montmorillonite type to improve the surface characteristics thereof which comprises adding the clay to a mixture of hydrated silica gel and sodium carbonate prepared by passing carbon dioxide into a solution of sodium silicate until a silica gel forms but the mixture remains alkaline, extruding the resulting mass at least once under a high fluid friction corresponding to a pressure of about 100 pounds per square inch and above through a $\frac{1}{32}$ inch orifice to accomplish dispersion and hydration of the clay, treating the extruded product while in the dispersed and hydrated state with sulfuric acid having a concentration within the range from about 45 to about 98 per cent $H_2SO_4$, diluting the resulting mixture with water, boiling the aqueous mixture to complete the reaction between the acid and replaceable metals in the clay, washing the product free of acid, and drying the acid-treated material.

ALLEN D. GARRISON.